(No Model.) 2 Sheets—Sheet 1.

F. W. SCHULZ.
Excavating Machine.

No. 239,857. Patented April 5, 1881.

Witnesses: Inventor:

N. PETERS, PHOTO-LITHOGRAPHER, WASHINGTON, D. C.

(No Model.)

F. W. SCHULZ.
Excavating Machine.

No. 239,857. Patented April 5, 1881.

Witnesses:
Jas Colgrave
A. H. Reuscher

Inventor:
Friedrich W. Schulz

UNITED STATES PATENT OFFICE.

FRIEDRICH W. SCHULZ, OF MOUNT PLEASANT, IOWA.

EXCAVATING-MACHINE.

SPECIFICATION forming part of Letters Patent No. 239,857, dated April 5, 1881.

Application filed December 24, 1880. (No model.)

*To all whom it may concern:*

Be it known that I, FRIEDRICH W. SCHULZ, a citizen of the United States, residing at Mount Pleasant, in the county of Henry and State of Iowa, have invented a new and useful Improvement in Excavating-Machines, of which the following is a specification.

My invention relates to that class of excavating-machines which plow and elevate the dirt into their own boxes or receptacles for transportation and move and dump it where desired.

The object of my invention is to provide a better and improved mechanism for operating the plow of an excavating-machine in thrusting it into and for withdrawing it from the ground, for shifting the dirt-elevating device in and out of gear with the driving power of the machine, and for adjusting the length of the elevator-frame in order to tighten or take up the slack of the elevator-chain, or vice versa, as may be required, all as hereinafter more fully explained.

Figure 1:
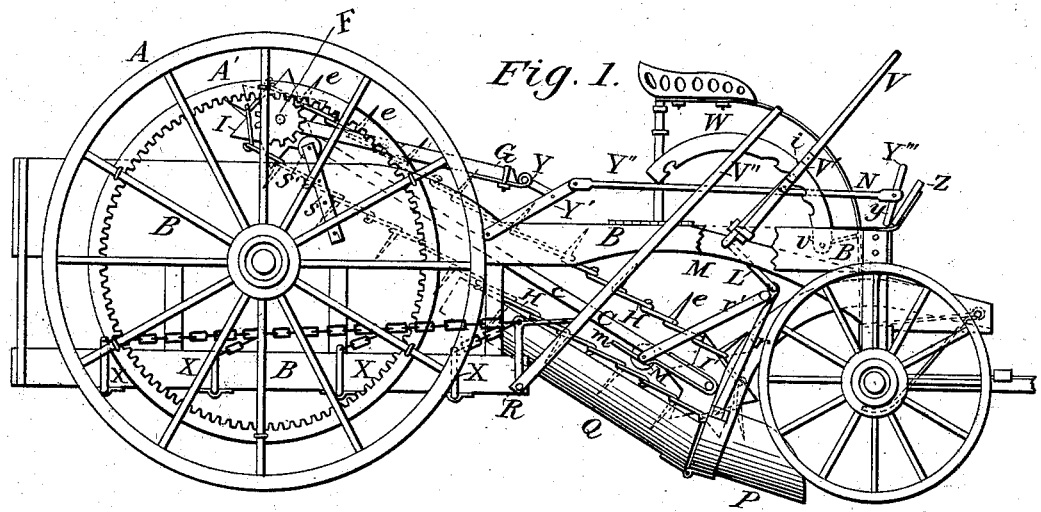
Figure 2:
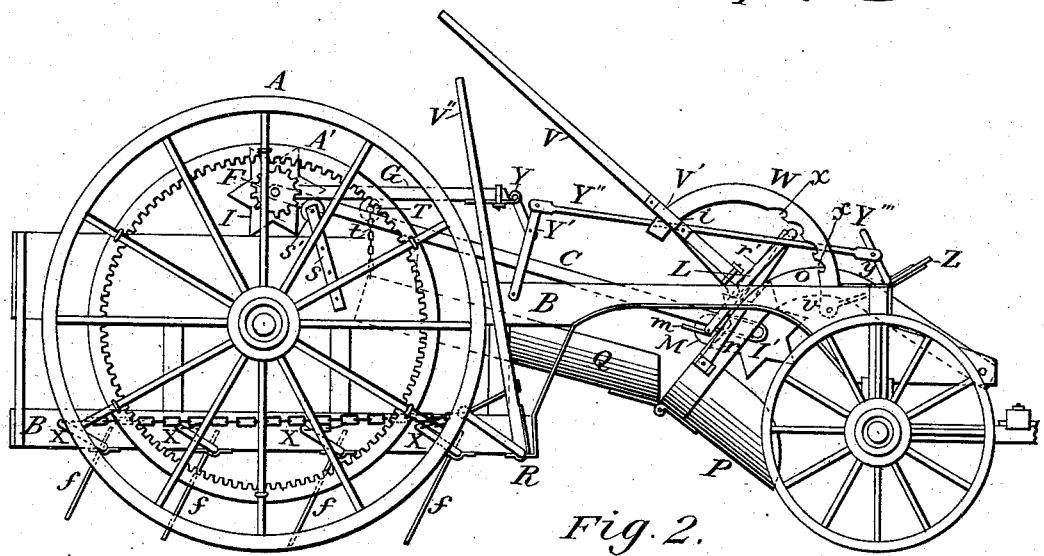
Figure 3:
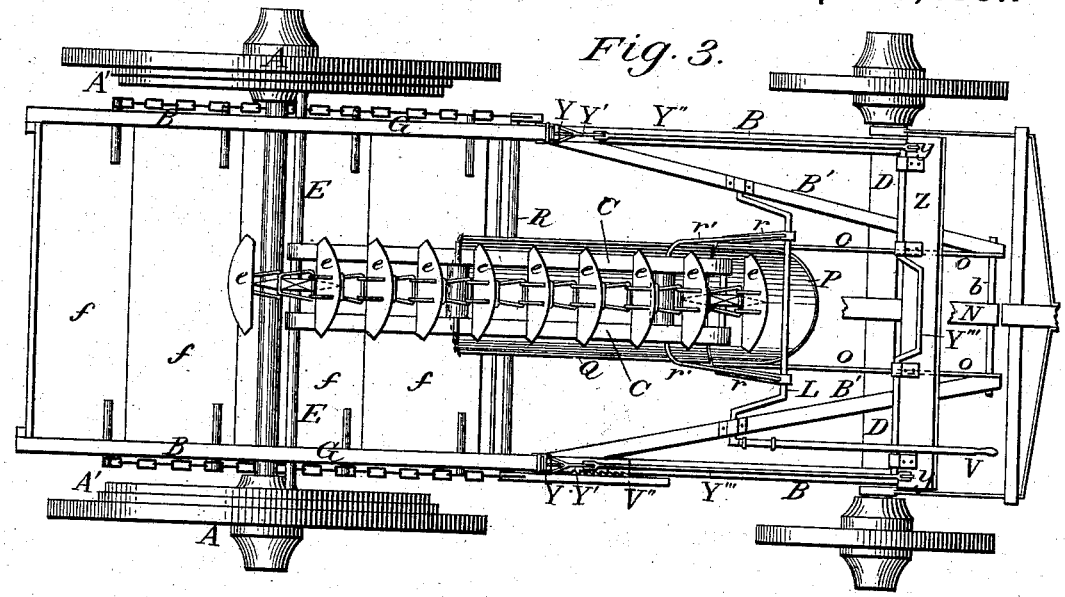
Figures 4, 5:
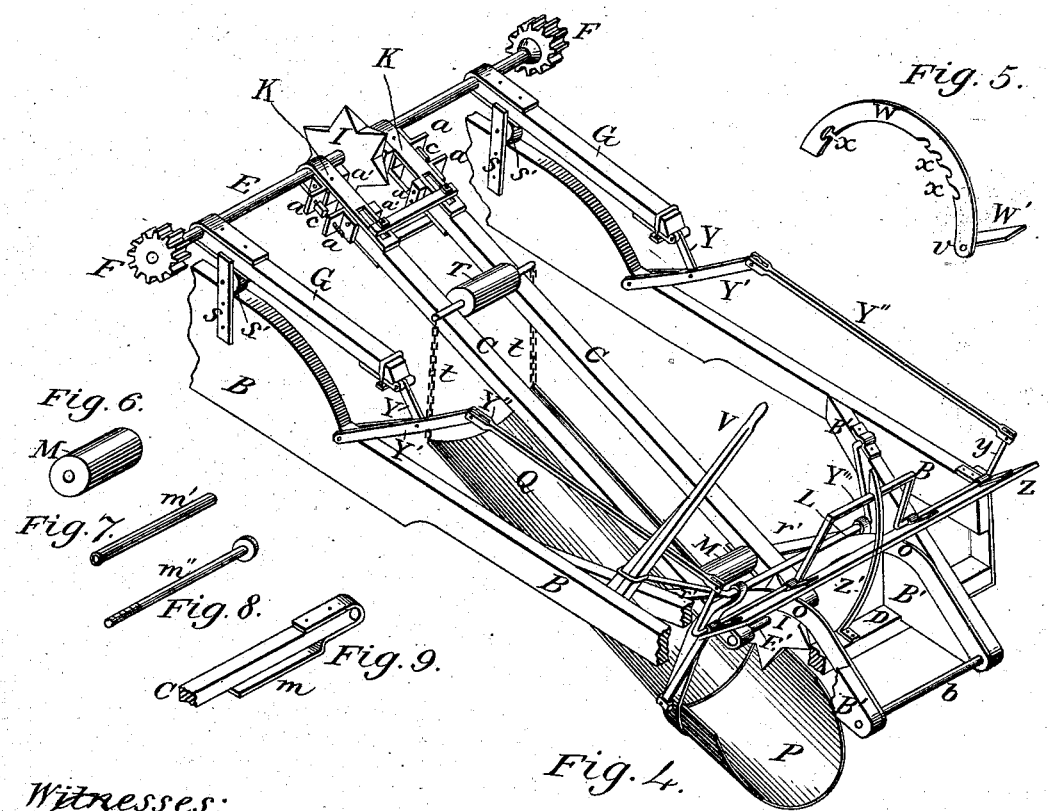

In the accompanying drawings, in which similar letters of reference indicate like parts and dotted lines such parts as are hid from view, Figure 1 is a side elevation when the plow and elevating mechanism are in position for working. Fig. 2 is a side elevation with the plow elevated and the elevating mechanism thrown out of gear with the driving-wheels, and the pivoted sections of the bottom down, as the position after dumping its load. Fig. 3 is a plan view, looking from above. Fig. 4 is a perspective of the plow as combined with the parts claimed as new of the adjusting and elevating mechanism of the machine, showing also parts of the frame-work to which said mechanism is attached. Fig. 5 is a view of the adjustable sector-ratchet for holding the operating-lever which shifts the plow and elevating mechanism in the different required positions.

A are the driving and main carrying wheels of the machine, being loosely pivoted to an axle passing through and supporting the box of the machine. To the wheels A are fastened internally-geared drive-wheels A'.

B is the main frame-work of the machine, and constitutes part of the box, to which is also attached the working parts.

B' are converging arms of said frame-work, attached to the main side pieces, B. They droop at their forward end, so as to rest on a bolster, D.

E is the driving-shaft of the elevating device, and is provided at each end with a pinion, F, which are operated, when in gear, by the wheels A'. Said shaft is supported in bearings at the ends of the arms G. Said arms rest loosely on rollers s', which rollers are pivoted in the upper ends of the uprights s, said uprights being fastened to the side frame-pieces, B.

To the center of shaft E is rigidly fastened a chain-pulley, I, and to each side of said pulley are pivoted the upper ends of the two bars C, forming the sides of the elevator-frame, said shaft E being the support for the upper end of said frame. To the lower end of said bars C is pivoted another shaft, E', having fastened on its center the chain-pulley I'. Said pulleys I and I' carry the endless chain H, to which are attached scrapers e, which scrape the dirt upward in the trough Q to the box of the machine. For the purpose of lengthening said bars or frame-pieces C in order to tighten or take up the slack of the chain H after it shall have been placed on the pulleys I and I', each of said side pieces or bars, C, is provided with an adjustable slip-joint, as shown in Fig. 4. Said joints are made by severing a small piece from one end and encircling the two edges of the same and the shaft E (thus forming a bearing) with a strap-band, K. The ends of said straps or bands are extended so as to lap on the other or longer part of said bars or side pieces a sufficient length to form said joints. In the extended ends of said strap K are longitudinal slits, in which the projecting ends of bolts through the ends of the bars C yield in adjusting the machine, and are tightened where desired by tightening the taps on said bolts.

On one side of each of the bars C are fastened lugs a, the flanges of which project outward so as to form taps or connections for the screws c, which screws, by their connections with said lugs, are the means of extending or contracting the length of the elevator-frame. On the opposite side of the bars C from the lugs a are fastened ears a', which, as well as said lugs, extend above and below sufficient to form bearings or guides for the edges of the straps K, which hold them straight or on an alignment with said bars.

Figure 6:
Figure 7:
Figures 8, 9:
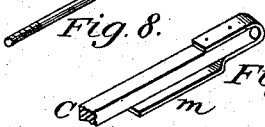

The lower end of the elevator-frame (consisting of the bars C and their appendages) is suspended by swing-bars $r'$ from the double elbow crank rock-shaft L, and as an adjustable bearing is necessary in order to conform with the oscillating motion of the elevator-frame, produced partly by its oscillations on the shaft E, to which it is pivoted, and partly by the motion given to said shaft in throwing the pinions F into and out of gear with the drive-wheels A', and also the motions of the rock-shaft L by means of the connecting or swinging bars $r'$, said adjustable bearing is formed by pivoting to the lower end of said swinging bars $r'$ the combination-roller, consisting of a bolt or rod, $m''$, Fig. 8, passing through a tubular shaft, $m'$, Fig. 7, and also through the lower ends of the bars $r'$, (one at either end of said shaft.) Said shaft $m'$, made to revolve loosely on said rod $m''$, is placed underneath the frame-pieces C C, with its ends playing in the slots formed by the hooks $m$, Fig. 9, said hooks being attached underneath the lower ends of the bars C C. On said shaft $m'$, and between the bars C C, is placed, so as to revolve loosely and independent, another roller, M, Fig. 6, which serves to carry the elevator-chain H in its downward movement and to press it downward at that point in its upward movement, and thereby the scrapers $e$ into the dirt as they pass under it.

The rock-shaft L has its bearings on the converging arms B' of the frame-work, and serves as the chief vertical support to the plow and lower part of the elevating mechanism, and by its movement imparts motion to said plow and elevator. Through the forward end of the converging arms B' is a rod or bar, $b$, which forms a bearing for the seat-spring N, and is also the pivot and support of the forward part of the curved draft-bar $o\ o$, which bar is shaped to fit and is placed around under the back end of the plow P, and is rigidly fastened to the same. To the back end of said plow is also attached, by hinge-coupling at their under or convex sides, the elevator-trough Q. The upper end of said trough is suspended by chains $t$, which chains are attached to the ends of a roller-axis, T', resting loosely crosswise on the bars C of the elevator-frame, and is therefore self-adjusting. The roller T is arranged to run loosely on its axis T', so as to be independent of its axis, for the purpose of resisting the sag of the elevator-chain H, by carrying it at that point in its downward movement.

The plow P is suspended from the rock-shaft L by means of the swinging bars $r$, and is, together with the parts attached thereto, made to oscillate by means of motion imparted by revolving said rock-shaft, which also causes a partial revolution of the draft-bar $o\ o$ upon the pivot-points at $b$, so as to throw it either in or out of the ground, as required. The rock-shaft L is operated by means of a lever, V, which is rigidly fastened to it at one end, and is held in the required position by means of the sector-ratchet W, Fig. 5, which is pivoted either to the frame-pieces B or to the foot-rest Z at $v$ in its lower end, with its upper end passing through a loop, V', on the lever V. Said loop is provided also with a pin, $i$, over which the notches $x$ in the ratchet take. Said ratchet W is also provided with a projecting step, W', upon which, by pressure of the foot, the ratchet is thrown up, and thereby freed from the pin $i$ preparatory to a readjustment of the machine.

Figure 10:
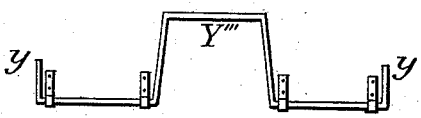

The supporting-arms G are provided with toggle-joints Y, connecting with oscillating levers Y', the lower ends of which levers are pivoted to the frame B and the upper ends coupled to connecting-rods Y'', which are likewise connected at their opposite or forward ends to the arms $y$ of the rectangular inflected rock-shaft Y''', Fig. 10. Said rock-shaft is hinged to the foot-rest Z, and by its connections is used by the operator to press the pinions F in gear with the drive-wheels A' by means of his foot against the upward middle bend of said shaft, thus oscillating said arms on their bearings $s'$. Said shaft is held with the parts in gear by the spring-catch Z', and is thrown out of gear by the gravity of the parts by detaching said rock-shaft from the catch Z'.

The box-bottom, composed of a series of trap or drop doors, $f$, (which I do not claim as new,) are operated in opening and closing by a new device consisting of a lever, V'', being rigidly fastened to a rock-shaft, R, which extends across the machine and is pivoted to the frame B. Said shaft is provided with crank-arms at each end, to which are attached chains coupling them with crank-arms X, fastened to each end, and forming the pivots of the doors $f$. Said mechanism closes said doors by a forward movement of the lever V'', which is held by an ordinary rack attached to the frame-work, and by detaching said lever from said rack the doors $f$ are opened by gravity.

Having thus fully described my invention so as to enable others skilled in the art to understand the same, what I claim as new, and desire to secure by Letters Patent, is—

1. In combination with the plow P and the frame B and B', the double-curved draft-bar $o\ o$, pivoted to the converging frame-pieces B' at $b$, so as to move in harmony with the action imparted by the rock-shaft L, substantially as and for the purpose herein shown.

2. In combination with the draft-bar $o\ o$ and the frame B and B', the rock-shaft L, swing-bars $r$ and $r'$, lever V, and ratchet W, all substantially as herein shown, and for the purposes specified.

3. The pendent chains $t$, combined with the bar T', frame-bars C, and trough Q, substantially as and for the purpose specified.

4. The combination, with the swinging bars $r'$ and the elevator-frame bars C, of the rod $m''$, shaft $m'$, and hooks $m$, forming an adjustable bearing for the lower end of the elevator-frame, substantially as shown, and for the purpose specified.

5. The roller M, in combination with the shaft $m'$, the frame-bars C, and the chain H, substantially as shown, and for the purposes specified.

6. In combination with the shaft E, frame B, uprights $s$, rollers $s'$, and foot-rest Z, the arms G, toggle-joints Y, oscillating lever $Y'$, rods $Y''$, and rock-shaft $Y'''$, all as herein arranged, and for the purposes described.

7. The uprights $s$, provided with the rollers $s'$, mounted upon frame B, in combination with the arms G and pinion-shaft E, substantially as shown, and for the purpose specified.

8. The adjustable slip-joints in the elevator-bars C, consisting in the severed parts of the bars C, straps K, lugs $a$, ears $a'$, and screws $c$, with cross-bars above and below connecting the two side pieces of the frame, said connecting-bars being fastened by means of bolts passing through their ends and also through the slots of the straps K and the bars C, all substantially as shown, and for the purposes specified.

FRIEDRICH W. SCHULZ.

Witnesses:
C. H. TEUSCHER,
JAS. COSGROVE.